United States Patent
Bivolaru et al.

(10) Patent No.: US 11,841,266 B2
(45) Date of Patent: Dec. 12, 2023

(54) EVANESCENT FIELD COUPLED SHOCK WAVE DETECTION SYSTEMS AND METHODS

(71) Applicant: Innoveering, LLC, Bohemia, NY (US)

(72) Inventors: Daniel Bivolaru, Hampton, VA (US); Jiaji Lin, Flushing, NY (US); George Papadopoulos, Nesconset, NY (US)

(73) Assignee: GENERAL ELECTRIC COMPANY, Schnectady, NY (US)

( * ) Notice: Subject to any disclaimer, the term of this patent is extended or adjusted under 35 U.S.C. 154(b) by 0 days.

(21) Appl. No.: 17/884,175

(22) Filed: Aug. 9, 2022

(65) Prior Publication Data
US 2022/0390273 A1 Dec. 8, 2022

Related U.S. Application Data

(63) Continuation of application No. 16/569,086, filed on Sep. 12, 2019, now Pat. No. 11,519,779.

(60) Provisional application No. 62/730,290, filed on Sep. 12, 2018.

(51) Int. Cl.
*G02B 6/26* (2006.01)
*G01H 9/00* (2006.01)
*G02B 6/12* (2006.01)

(52) U.S. Cl.
CPC ......... *G01H 9/004* (2013.01); *G02B 6/12019* (2013.01); *G02B 2006/12138* (2013.01)

(58) Field of Classification Search
CPC ... G01H 3/00; G01H 9/00; G02B 6/42; G02B 6/00; G02B 6/10; G02B 6/12; G02B 6/24; G02B 6/26; G02B 6/27; G01N 21/412; G01F 1/76

USPC ............................................. 250/227.14, 239
See application file for complete search history.

(56) References Cited

U.S. PATENT DOCUMENTS

| 6,650,799 B2 | 11/2003 | Lyons |
| 7,648,100 B2 | 1/2010 | Kremeyer |
| 8,445,841 B2 * | 5/2013 | Szobota ............... G01N 21/552 250/254 |

(Continued)

OTHER PUBLICATIONS

Yu, F.T.S., Ruffin, P.B., and Yin S., Fiber Optic Sensors, New York: Marcel Dekker, Inc., 2002.

(Continued)

*Primary Examiner* — Que Tan Le
(74) *Attorney, Agent, or Firm* — George Likourezos; Carter, DeLuca & Farrell LLP

(57) ABSTRACT

A fluid properties sensing system includes an optical sensor which generates a sensor signal based on received laser light, a light source which transmits laser light through a transmitting fiber to a sensor head, a receiver that detects a portion of the laser light from a receiving fiber through an evanescent field of the transmitting fiber when the laser light radiates through a transmitting fiber wall of the transmitting fiber and interacts with a fluid medium at an interface of the sensor and the fluid medium, and a processor. The fibers are coupled at one end through the evanescent field to form the sensor head disposed in a flow field and to interact with the fluid medium. The processor identifies a change in the sensor signal based on a detected portion of the laser light resulting from an interaction of the sensor head with the fluid medium.

20 Claims, 9 Drawing Sheets

(56) References Cited

U.S. PATENT DOCUMENTS 9,518,248 B2 12/2016 Erickson et al.
2011/0148717 A1 6/2011 Kremeyer

OTHER PUBLICATIONS

Gholamzadeh, B., and Nabovati H., "Fiber Optic Sensors," International Journal of Electronics and Communication Engineering, vol. 2, No. 6, pp. 1107-1117, 2008.
Bao, X., and Chen, L., "Recent Progress in Distributed Fiber Optic Sensors," Sensors, vol. 12, pp. 8601-8639, 2012.
Schott, T., Munk, M., Herring, G.C., Grinstead, J., and Prabhu, D.K., "Fiber-Based Measurement of Bow-Shock Spectra for Reentry Flight Testing," in 48th AIAA Aerospace Sciences Meeting Including the New Horizons Forum and Aerospace Exposition, Orlando, Florida, Jan. 4-7, 2010.
Curran, E.T., Heiser, W.H., and Pratt, D.T., "Fluid Phenomena in Scramjet Combustion Systems," Annual Review of Fluid Mechanics, vol. 28, pp. 323-360, 1996.
Heiser, W.H., and Pratt, D.T., Hypersonic Air Breathing Propulsion, New York: AIAA Education Series, 1993.
Matsuo, K., Miyazato, Y., and Kim, H.-D., "Shock train and pseudo-shock phenomena in internal gas flows," Progress in Aerospace Sciences, vol. 35, pp. 33-100, 1999.
Neaves, M.D., McRae, S., and Edwards, J. R., "High-Speed Inlet Unstart Calculations Using an Implicit Solution Adaptive Mesh Algorithm," AIAA Paper 2001-0825, 2001.
McDaniel, K.S. and Edwards, J.R., "Three-Dimensional Simulation of Thermal Choking in a Model Scramjet Combustor," AIAA Paper 2001-0382, 2001.
Valdivia, A., Yuceil, K.B., Wagner, J.L., Clemens, N.T., and Dolling, D.S., "Active Control of Supersonic Inlet Unstart Using Vortex Generator Jets," in 39th AIAA Fluid Dynamics Conference, AIAA Paper 2009-4022, 2009.
Le, D.B., Goyne, C.P., and Krauss, R.H., "Shock Train Leading Edge Detection in a Dual-Mode Scramjet," Journal of Propulsion and Power, vol. 24, No. 5, pp. 1035-1041, 2008.
Le, D.B., Goyne, C.P., Krauss, R.H., and McDaniel, J.C., "Experimental Study of a Dual-Mode Scramjet Isolator," Journal of Propulsion and Power, vol. 24, No. 5, pp. 1050-1057, 2008.
Donbar, J.M., Linn, G.J., Srikant, S., and Akella, M.R., "High-Frequency Pressure Measurements for Unstart Detection in Scramjet Isolators," in 46th AIAA/ASME/SAE/ASEE Joint Propulsion Conference & Exhibit, AIAA 2010-6557, 2010.
Thio, T., "A Bright Future for Subwavelength Light Sources: Generating tiny points of light for such things as storing data on optical disks is aided by a new theory involving evanescent waves," American Scientist, vol. 94, No. 1, pp. 40-47, 2006.
Marston, P. L., "Scattering of acoustic evanescent waves by circular cylinders: Partial wave series solution," The Journal of the Acoustical Society of America, vol. 111, No. 5, pp. 2378-2378, 2002.

\* cited by examiner

EVANESCENT FIELD COUPLED SHOCK WAVE DETECTION SYSTEMS AND METHODS

CROSS-REFERENCE TO RELATED APPLICATIONS

This application is a continuation of U.S. patent application Ser. No. 16/569,086, filed on Sep. 12, 2019, which claims the benefit of U.S. Provisional Patent Application No. 62/730,290, filed on Sep. 12, 2018, the entire contents of each of which are incorporated herein by reference.

BACKGROUND

Measurements of various physical and chemical properties, including pressure, temperature, magnetic field, current, rotation, acceleration, displacement, chemical concentration, reaction rate, pH, detection of pollutant gases, etc. have been achieved using fiber optic sensors. They offer immunity to electromagnetic interference, radio frequency interference, and geometrical versatility. Furthermore, since optical fibers are purely dielectric, they can be used in hazardous areas where conventional electrical or electronic sensors are not safe. Fiber optic sensors have added advantages like very short response time and remote-sensing capability, which means that transmission of information from various sensor heads to the destination, could be easily achieved. Furthermore, they can be readily interconnected to offer scalability of measurement and/or distributed sensing. A variety of schemes, including different detection and analysis techniques applied from very low to hypersonic speed flows, have been adopted in the design and development of fiber optic sensors.

A crucial aspect in the development of ramjets and other supersonic air-breathing engines are the inlet and isolator components. These pre-combustion components are designed to capture and supply stable airflow at a rate demanded by the combustor while maintaining high-pressure recovery and an appropriate stability margin under various engine operating conditions. Changes in the inlet-isolator flow structure can influence the downstream combustion process, thus leading to undesirable behavior, such as flame blow off and flashback. Controlling the oscillatory behavior of an inlet-isolator flow caused by longitudinal combustion instabilities is thus important to mitigating engine unstart. Typically, a strong pre-combustion shock system (known as a "shock-train") forms in the isolator resulting in subsonic combustor entrance flow in the ramjet mode of operation. Depending on the isolator entrance conditions, this can be either a "normal shock-train" containing a series of bifurcated normal shocks or an "oblique shock-train" which contains a series of crossing oblique shocks. Studies of inlet unstart have shown that boundary layer separation plays an important role in the onset of unstart. Shock wave/boundary-layer interactions (SWBLI), which lead to boundary layer separation in supersonic inlets, are very complex and thus, attempting to control them in supersonic inlets continues to be a challenge.

SUMMARY

A new insight into the dynamics of boundary layers in the presence of shock waves is presented through the implementation of a measurement technique that combines evanescent field physics with optical fiber technology.

This disclosure relates to systems and methods for detecting discontinuities in fluid properties existing in the boundary layer at the wall in supersonic and hypersonic fluid applications and, more particularly, to an optical sensor for detecting moving shock waves interacting with the boundary layer at the wall.

In accordance with aspects of this disclosure, a system for sensing fluid properties is presented. The system includes an optical sensor including at least two optical fibers to transmit and receive laser light. The optical sensor is configured to generate a sensor signal based on the received laser light. The at least two optical fibers include at least one transmitting optical fiber and at least one receiving optical fiber. The at least two optical fibers are configured to be coupled at one end through an evanescent field of the at least one transmitting optical fiber to form an optical sensor head. The optical sensor head configured to be disposed in a flow field and configured to interact with a fluid medium. The system further includes a light source configured to transmit laser light through the at least one transmitting optical fiber to the optical sensor head, a receiver configured to detect a portion of the laser light from the at least one receiving optical fiber through the evanescent field when the laser light radiates through a transmitting optical fiber wall of the at least one transmitting optical fiber and interacts with the fluid medium at an interface of the optical sensor and the fluid medium, a processor in electrical communication with the optical sensor, the processor configured to identify a change in the sensor signal based on a detected portion of the laser light resulting from an interaction of the optical sensor head with the fluid medium In an aspect of the present disclosure, the optical sensor may be configured to interact with the fluid medium when the fluid medium is moving at supersonic or hypersonic speeds.

In another aspect of the present disclosure, the optical sensor may be configured to detect a moving shock wave in the fluid medium.

In yet another aspect of the present disclosure, the optical sensor may be configured to further detect a direction of the moving shock wave relative to the optical sensor.

In a further aspect of the present disclosure, the optical sensor may be configured to interact with the fluid medium at a boundary layer of the fluid medium, the boundary layer disposed at the interface.

In an aspect of the present disclosure, the optical sensor may be configured to further detect a dynamic state of the boundary layer.

In accordance with aspects of this disclosure, a method for measuring fluid medium properties in a fluid medium at an interface of the fluid medium and an optical sensor is presented. The method includes disposing, in a flow field, an optical sensor including at least two optical fibers to transmit and receive laser light, the optical sensor configured to interact with the fluid medium and generate a sensor signal based on the received laser light, the optical sensor including an optical sensor head; transmitting, by an electromagnetic radiation source, laser light through a transmitting waveguide to the optical sensor head; detecting a portion of the laser light from at least one receiving waveguide through an evanescent field; and identifying a change in the sensor signal based on a detected portion of the laser light resulting from an interaction of the optical sensor head with a fluid medium.

In another aspect of the present disclosure, the transmitting waveguide may include at least one transmitting optical fiber, and the receiving waveguide may include at least one receiving optical fiber.

In yet another aspect of the present disclosure, the method may further include coupling at least two optical fibers of the sensor head at one end through an evanescent field of the at least one transmitting optical fiber to form the optical sensor head. Detecting the portion of the laser light from the at least one receiving waveguide through the evanescent field may further include detecting the portion of the laser light from the at least one receiving waveguide through the evanescent field when the laser light radiates through a transmitting optical fiber wall of the at least one transmitting optical fiber and interacts with the fluid medium at the interface.

In a further aspect of the present disclosure, the method may further include directionally coupling the at least one transmitting optical fiber and the at least one receiving optical fiber through the evanescent field of the at least one transmitting optical fiber to generate a sensor signal by the optical sensor head when the at least one transmitting optical fiber and the at least one receiving optical fiber are partially immersed in the fluid medium.

In an aspect of the present disclosure, the electromagnetic radiation source may include a laser source.

In another aspect of the present disclosure, the method may further include transmitting laser radiation from the optical sensor head by the transmitting waveguide, and receiving laser radiation from the optical sensor head by the receiving waveguide.

In yet another aspect of the present disclosure, the optical sensor may be configured to interact with the fluid medium when the fluid medium is moving at supersonic or hypersonic speeds.

In a further aspect of the present disclosure, the method may further include detecting a moving discontinuity in fluid medium properties of the fluid medium, the moving discontinuity including a moving shock wave, a moving shock train, or combinations thereof.

In an aspect of the present disclosure, the method may further include detecting a direction of the moving discontinuity relative to the optical sensor head.

In another aspect of the present disclosure, the fluid medium may include a boundary layer of the fluid medium at the interface. The method may further include detecting a dynamic state of the boundary layer.

In accordance with aspects of this disclosure, a method for measuring fluid medium properties in a fluid medium at an interface of the fluid medium and an optical sensor is presented. The method includes disposing, in a flow field, an optical sensor including at least two optical fibers to transmit and receive laser light, the optical sensor configured to interact with the fluid medium and generate a sensor signal based on the received laser light, the optical sensor including an optical sensor head; transmitting, by an electromagnetic radiation source, laser light through a transmitting waveguide to the optical sensor head; detecting a portion of the laser light from at least one receiving waveguide through an evanescent field when the laser light radiates through a transmitting optical fiber wall of the at least one transmitting waveguide and interacts with the fluid medium at the interface; and identifying a change in the sensor signal based on a detected portion of the laser light resulting from an interaction of the optical sensor head with a fluid medium.

In a further aspect of the present disclosure, the electromagnetic radiation source may include a laser source.

In yet another aspect of the present disclosure, the transmitting waveguide may include at least one transmitting optical fiber, and the receiving waveguide may include at least one receiving optical fiber.

In an aspect of the present disclosure, the method may further include transmitting and receiving laser radiation from the optical sensor head with the at least one transmitting waveguide and the at least one receiving waveguide.

In an aspect of the present disclosure, the method may further include correlating the identified change in the sensor signal with the fluid medium properties change In accordance with aspects of this disclosure, a system for detecting a moving shock wave in a fluid is presented. The system includes an optical sensor configured to be disposed in a flow field of a fluid, a receiver, a light source, and a processor. The optical sensor includes at least two optical fibers. The optical fibers include optical fiber walls and are configured to transmit and receive laser light having an evanescent field. The receiver is configured to detect a portion of the evanescent field of the laser light when the evanescent field radiates through the optical fiber walls of the optical fibers and interacts with the fluid. The light source is configured to generate the laser light and is coupled to the optical sensor. The processor is configured to identify a magnitude of the evanescent field based on a change in an index of refraction of the laser light.

In an aspect of the present disclosure, the system may further include a user interface coupled to the processor. The user interface may be configured to enable user control of laser properties of the laser light.

In another aspect of the present disclosure, the system may include a display coupled to the processor. The display may be configured to display the identified magnitude of the evanescent field.

In an aspect of the present disclosure, the fluid may include a supersonic fluid and/or a hypersonic fluid containing shock waves.

In yet another aspect of the present disclosure, the at least two optical fibers may be parallel to each other and wherein the at least two optical fibers are coupled together to facilitate directional coupling of laser radiation of the laser light.

In a further aspect of the present disclosure, the laser light may be monochromatic laser light.

In an aspect of the present disclosure, the processor may be configured to identify an amount of radiation coupled to the receiver.

In an aspect of the present disclosure, the optical sensor may be configured to detect a perturbance in the flow field such as a moving shock wave interacting with the boundary layer at the wall.

In another aspect of the present disclosure, the optical sensor may be configured to further detect a direction of the moving shock wave relative to the optical sensor.

In yet another aspect of the present disclosure, the fluid may include a boundary layer. The processor may be configured to further detect a dynamic state of the boundary layer.

In accordance with aspects of this disclosure, a method for detecting a shock wave in a fluid is presented. The method includes generating a laser light, positioning the laser light in a flow field of a fluid. The laser light includes an evanescent field of the fiber at the interface with the fluid. The method further includes receiving a portion of the laser light, detecting a portion of an evanescent field radiating through optical fiber walls of at least two optical fibers and interacting with the fluid, detecting a change in an index of refraction of the light, and identifying a magnitude of the evanescent field emanating from a light source configured to generate laser light.

In an aspect of the present disclosure, the method may further include displaying on a display the identified magnitude of the evanescent field.

In another aspect of the present disclosure, the fluid may include a supersonic fluid and/or a hypersonic fluid.

In yet another aspect of the present disclosure, the at least two optical fibers may be parallel to each other. The at least two optical fibers may be coupled together to facilitate directional coupling of laser radiation of the laser light.

In a further aspect of the present disclosure, the laser light may be monochromatic.

In yet a further aspect of the present disclosure, the method may further include identifying an amount of radiation coupled to the receiver.

In accordance with aspects of the disclosure, the optical sensor may include at least one transmitting fiber and at least one receiving fiber.

In an aspect of the present disclosure, the method may further include detecting, by the at least two optical fibers, a moving shock wave in the flow field.

In another aspect of the present disclosure, the method may further include detecting a direction of the moving shock wave relative to at least two optical fibers.

In yet another aspect of the present disclosure, the fluid may include a boundary layer. The method may further include detecting a dynamic state of the boundary layer.

The details of one or more aspects of this disclosure are set forth in the accompanying drawings and the description below. Other aspects, features, and advantages will be apparent from the description, the drawings, and the claims that follow.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A better understanding of the features and advantages of the disclosed technology will be obtained by reference to the following detailed description that sets forth illustrative embodiments, in which the principles of the technology are utilized, and the accompanying drawings of which.

Figure 1:
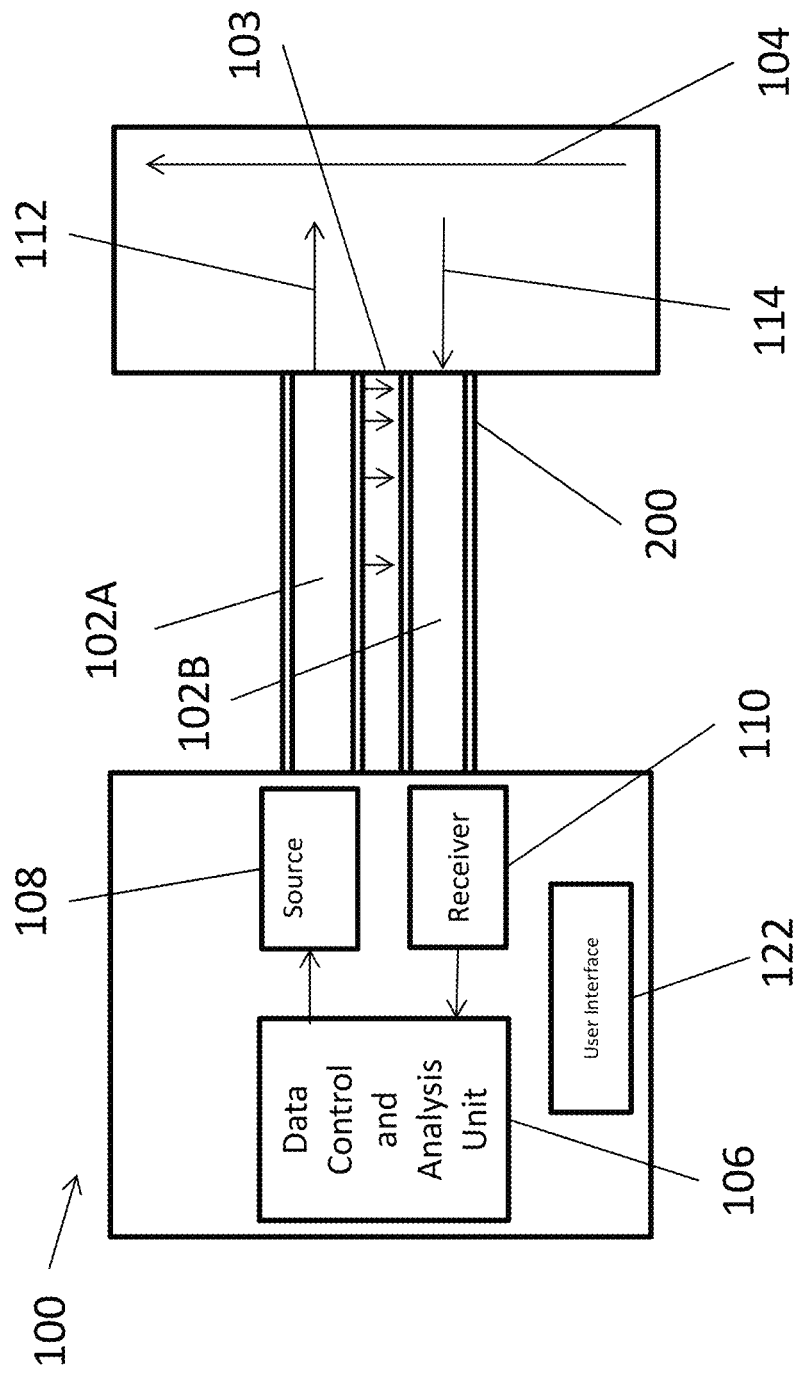
FIG. 1 is a block diagram of one embodiment of a system containing one transmitting and one receiving optical fibers for detecting a shock wave in a fluid at the wall interface.

Further details and aspects of exemplary embodiments of the disclosure are described in more detail below with reference to the appended figures. Any of the above aspects and embodiments of this disclosure may be combined without departing from the scope of the disclosure.

DETAILED DESCRIPTION

This disclosure relates to optical-based systems and methods for detecting a shock wave.

Although this disclosure will be described in terms of specific embodiments, it will be readily apparent to those skilled in this art that various modifications, rearrangements, and substitutions may be made without departing from the spirit of this disclosure.

For purposes of promoting an understanding of the principles of this disclosure, reference will now be made to exemplary embodiments illustrated in the drawings, and specific language will be used to describe the same. It will nevertheless be understood that no limitation of the scope of this disclosure is thereby intended. Any alterations and further modifications of the inventive features illustrated herein, and any additional applications of the principles of this disclosure, as illustrated herein, which would occur to one skilled in the relevant art and having possession of this disclosure, are to be considered within the scope of this disclosure.

FIG. 1 shows a diagram of an evanescent field-based system 100 for detecting a shock wave in accordance with an embodiment of the disclosure. The evanescent field-based system 100 generally includes an optical sensor 200 or probe, a light source 108, a receiver 110, a data control unit and analysis unit 106, and a user interface 122.

In embodiments, the optical sensor 200 includes directionally coupled optical fibers 102A, 102B. In embodiments, the evanescent field-based system 100 uses optical fibers 102A, 102B for transmitting and receiving monochromatic light 112, 114 to and from an optical sensor 200 whose exposed tip is immersed in a flow field of a supersonic fluid or a hypersonic fluid 104. The light from the light source 108, which may generate monochromatic laser light, is directed towards the exposed tip of the optical sensor 200 using the transmitting optical fibers 102A. The optical sensor 200 may consist of two or more parallel optical fibers 102 directionally coupled together such to facilitate the transfer of a small portion of the laser radiation transmitted from the source back to the receiver. At the fluid interface, the optical sensor 200 transmits most of the radiation energy in a parallel direction towards the environment, with a small portion of this radiation transmitted through the evanescent field in a perpendicular direction towards the receiving fiber. The receiver 110 may include an avalanche photo-detector (APD) and/or a fast-response photodiode, for example. In this implementation, the light source 108 is a laser light source. The light source 108 may include a laser diode. The data control and analysis unit 106 may include an analog to digital converter and a processing unit. The user interface 122 includes a display and is used to control and monitor the optical sensor 200 response via the data control and analysis unit 106.

From an analysis of the electromagnetic theory of Maxwell, the flux of energy that leaves a closed volume in space is equal with the flux of the Poynting vector:

$$\vec{S} = \frac{c}{4\pi}(\vec{E} \times \vec{H}). \quad (1)$$

where $\vec{E}$ and $\vec{I_r}$ are the intensities of the electric and magnetic fields respectively. If the electromagnetic fields are plane waves represented by sinusoidal functions of frequency v and angular velocity ω=2πv, then it can be shown that the modulus of the vector $\vec{S}$ is given by the equation:

$$|\vec{S}| = \frac{cn}{4\pi}E_0^2 \cos^2 \omega\left(t - \frac{L}{c}\right). \quad (2)$$

where the quantity:

$$L = \int dL(x,y,z) = \int \text{grad} L \, dl \quad (3)$$

is the optical path in the direction of propagation and x, y and z are the space coordinates. The gradient of L is parallel with $\vec{S}$ and perpendicular to the field vectors $\vec{E}$ and $\vec{I_r}$ therefore:

$$|\text{grad}L|^2 \approx \epsilon\mu \text{ or } |\text{grad}L| \approx \sqrt{\epsilon\mu} = n, \quad (4)$$

where n is the index of refraction. From Eq. (2), the transfer of energy is proportional to the wave frequency and is dependent to the changes of the index of refraction of the medium along the optical path L.

To estimate the energy transfer in the perpendicular direction (z-axis) relative to the propagation direction (x-axis), let us consider a plane monochromatic wave with the electric field vector given by:

$$|\vec{E_1}| = \vec{a_1} \exp^{i2\pi\left(vt - \frac{\vec{u_1}\vec{r}}{\lambda_1}\right)} \quad (5)$$

at the separation plane between the optical fiber (with the index of refraction n1) and the air medium with the index of refraction n2. At the interface, the light beam reflects and refracts in a direction according to the Huygens-Fresnel theory. In Eq. (5), $\vec{a_1}$ is the complex amplitude of the electric field vector, $\vec{u_1} = \vec{i} \rightarrow \alpha_1 + \vec{k} \rightarrow \gamma_1$ is the propagation direction where α1 and γ1 are the direction cosines between $\vec{\alpha_1}$ and the x-axis and respectively the z-axis, and the vector $\vec{r}$ refers to the location of a point in space reached by the wave with the wavelength λ1. Similar equations are obtained for the transmitted and reflected waves. For n1>n2 and the incidence angle in medium 1 of i1 greater than the critical angle, the transmitted electric field vector in air (medium 2) can be expressed as:

$$|\vec{E_2}| = \vec{a_2} \exp^{-k_2 z \sqrt{\frac{1}{n^2}\sin^2 i_1 - 1}} \exp^{-k_2 x \frac{\sin i_1}{n}}, \quad (6)$$

where k2=2πλ2 is the wave vector in medium 2. This wave is named the evanescent wave. It is a non-homogenous transverse wave with the amplitude varying locally and decaying exponentially in the z-direction. In the planes of equal amplitude parallel to the interface (z=ct) the wave amplitude decays to 1/e in a distance on the order of λ2 and the planes of equal phase (x=ct) are perpendicular to the interface. For stationary states and for an infinite interface, despite the fact that the Poynting vector is in general finite, the average value is zero. The energy oscillates on both sides of the interface with no net energy flow in the perpendicular direction, but the energy propagates along the interface in the plane of incidence.

Therefore, for two closely spaced optical fibers, the interaction with the medium and the energy transfer from one fiber to the other is possible only at the interface between the transmitting and the receiving fibers where the critical angle of incidence can be met. A number of photons from the background radiation scattered from the environment (for example, facility walls) enter the receiving fiber and contribute as the background noise. The wavelength of this background radiation is identical to the laser radiation. Due to the small acceptance angle of the receiving fiber head (NA=0.22), the probability of receiving scattered photons from the far-field background radiation is small. As indicated earlier, at the interface of the optical sensor 200 with the fluid, the transfer of energy in the perpendicular direction (parallel to the wall) is non-zero due to the non-uniformities of the interface (the Poynting vector is not zero at the wall because of the finite size of the wall). Therefore, a small portion of the evanescent wave field radiating from the source fiber in the perpendicular direction interacts with the medium and is transmitted or "leaks out" continuously towards the receiving fiber(s). The spatial scale where the interaction takes place is on the order of the penetration depth of the evanescent field outside of the transmitting fiber boundary, which is on the order of the laser wavelength (λi). The connection between the electromagnetic field and the fluid field is the Gladstone-Dale equation given by:

$$n = 1 + G_D(\lambda)*\rho, \quad (7)$$

where ρ is the local gas density, and $G_D(\lambda)$ is the Gladstone-Dale constant function of the wavelength of the light source. For air at the wavelength of 540 nm, the value is $G_D$|540 nm=2.2588-04 m3/kg. This weak interaction of the electromagnetic wave with the fluid at the wall is demonstrated in this work by two independent measurements performed in a static and dynamic environment.

Figure 2:
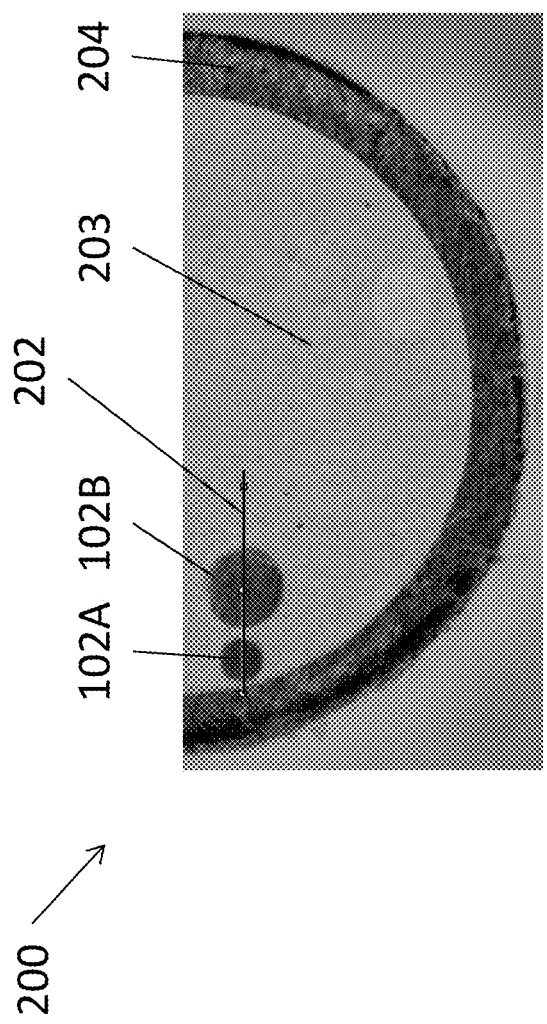
FIG. 2 is a surface image of a fiber configuration used as the sensing element of the system of FIG. 1.
Figure 3:
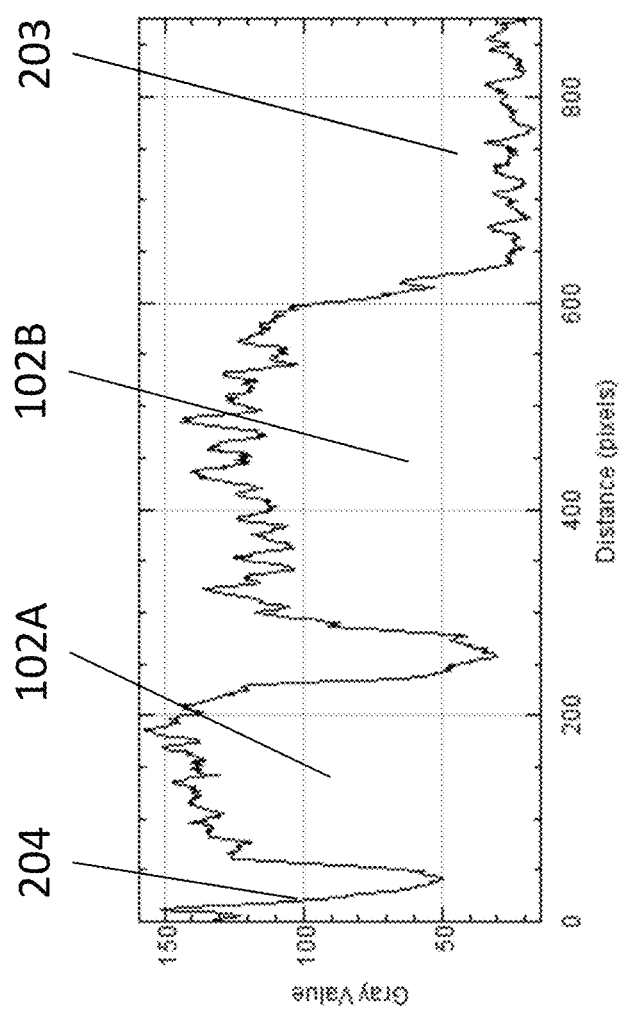
FIG. 3 is an illustration of an intensity profile from a surface image across line 202 in FIG. 1 showing average fiber spacing.

With reference to FIG. 2, a surface image of the optical sensor 200 of the system of FIG. 1 is shown. Although any number of fibers may be utilized, in various embodiments, a minimum of two fibers may be used with a fiber separation distance small enough to facilitate the energy transfer between fibers through the evanescent field. In various embodiments, the diameter of the multimode fibers may be about 100 μm for the transmitting fiber 102A and may be 200 μm for the receiving fiber 102B with the apparent distance between fibers of about 20 microns. White light was used to illuminate the end of the fibers and obtain the image. The spatial resolution obtained from the intensity profile shown in FIG. 3 along line 202 (of FIG. 2), is approximately 0.5 μm per pixel. For example, a compact 20-mW fiber-coupled diode laser operating at a wavelength of 540 nm may be used as the laser source 108. The laser source 108 was connected to one of these fibers 102A (source fiber) while the others were connected to fast, 2 nanosecond response time APD (avalanche photo-detectors) photodetectors (receiving fibers 102B), or vice versa. The fibers may be embedded in a ceramic body 203 and mounted in a metallic fixture 204.

Figure 4:
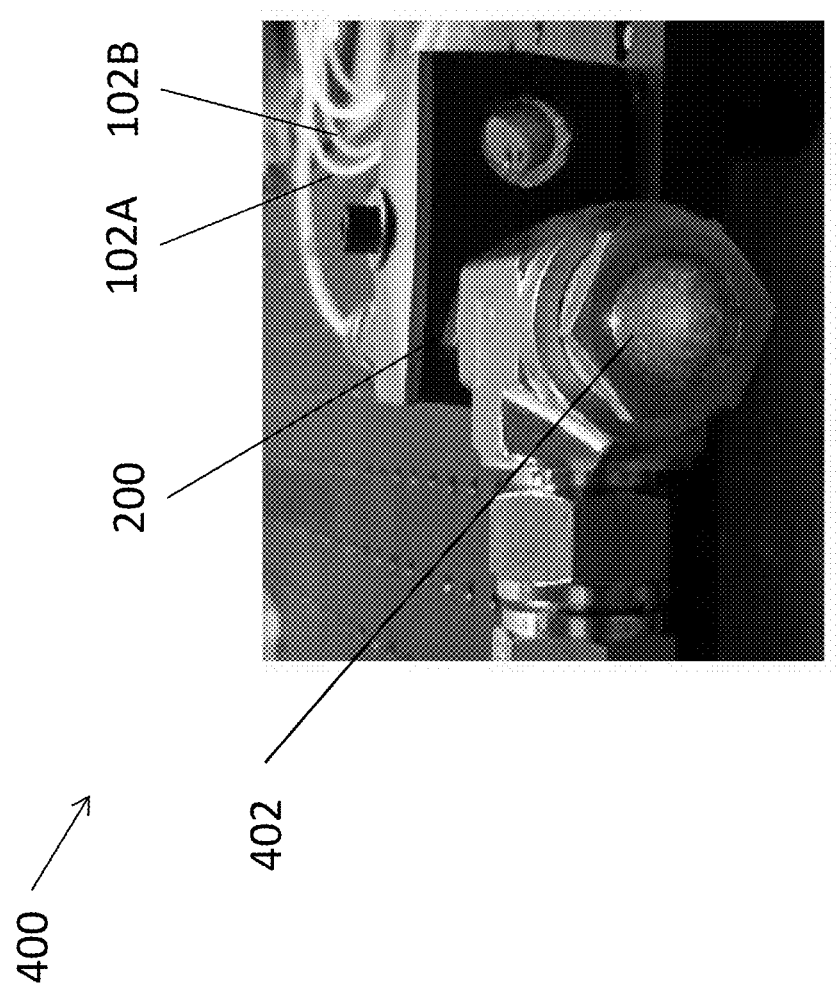
FIG. 4 is an illustration of an optical sensor of the system of FIG. 1 installed in a high-pressure static test cell.

With reference to FIG. 4, the optical sensor 200 mounted in a static pressure gas cell 400 for tests at high pressure is shown. The high-pressure test cell 400 consists of a stainless steel chamber having an inlet port for the feedstock gas supply (Air) and a special fitting to accept the optical sensor 200. A high-pressure window 402, rated to over 70 atm, was used to visualize the background radiation. Purging of the high-pressure test cell 400 down to ambient atmospheric pressure was performed manually using a release valve.

The non-uniform changes in the index of refraction (via density or pressure at constant temperature), induced by a moving perturbance in the flow field at the wall, changes the amount of energy transferred from the evanescent field towards the receiver. Near the wall, the perturbance also changes the frequency of the wave leaking from the evanescent field towards the receiver due to the Doppler Effect. The component of the flow stream velocity near the wall is parallel with the interface and parallel with the propagation direction of the evanescent field. Therefore, the change in the wave frequency due to change in velocity in the layers close to the wall (at a distance of the order of $\lambda$) is small (the velocity is zero at the wall due to the no-slip condition). The change in the index of refraction in air at standard conditions as a function of the gas pressure is about 0.5% for a pressure increase from ambient atmospheric conditions to about 20 atm. Therefore, the expected changes in the index of refraction due to the increase in the pressure across a shock wave at approximately Mach 2 is negligible (<0.02% @ 2 atm)).

Figure 5:
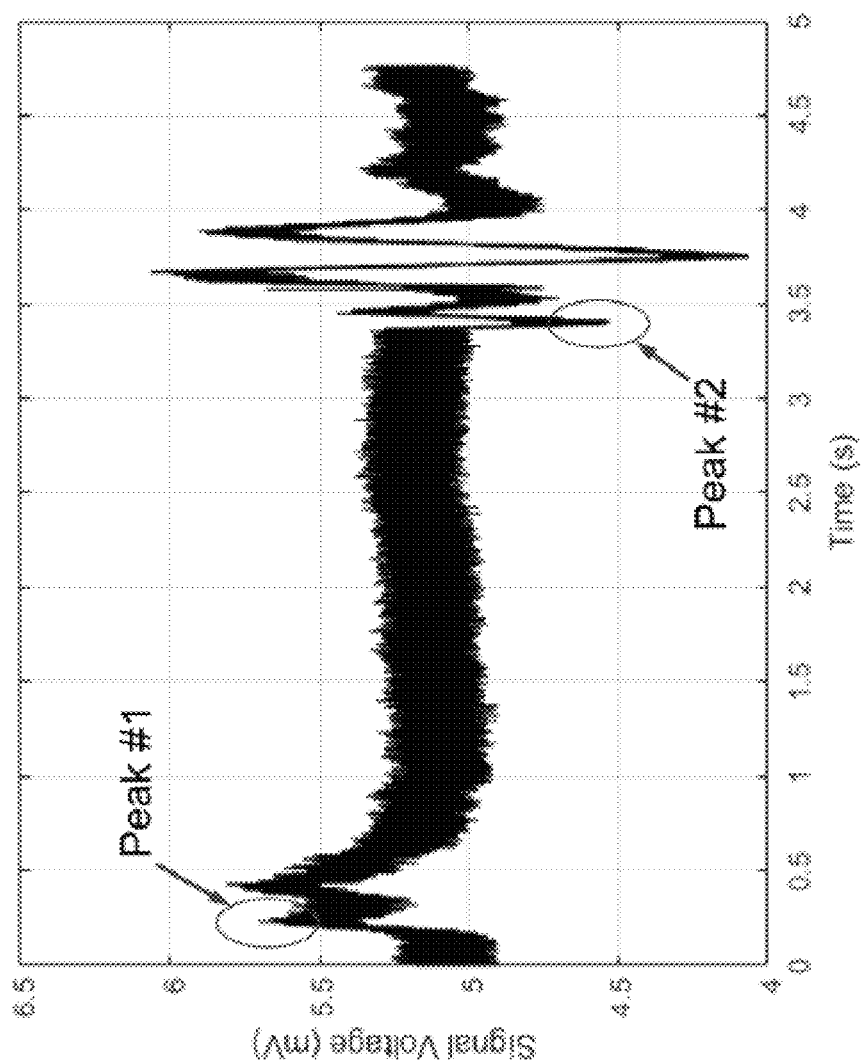
FIG. 5 is an illustration of a signal generated during a high-pressure test of the optical sensor of the system of FIG. 1.

Experiments performed in the static pressure cell at pressures up to 17 atm show clearly that, although small, the sensor signal decreases with the increased pressure (therefore increased density) at constant temperature via the changes in the index of refraction. The signal decreases approximately 223 $\mu V$ from a mean DC signal of 4480 $\mu V$ or equivalently 5.2% in the range of pressures from 2.7 atm to 17 atm). Unsteady measurements performed in the same cell by abruptly releasing the gas pressure from the chamber using the release valve show a much larger variation of the signal of about 12.4% relative to the average signal. This is attributed to the nonlinear change in the index of refraction along the optical path L. The gradient of L defines how much energy is transferred through the medium 2 (Eq. 2). The sensor signal from a test performed at a pressure of about 12.2 atm is shown in FIG. 5. The average signal at the beginning of the test is the steady-state value at about 12.2 atm. The strong signal fluctuations are attributed to the shock wave generated by the sudden expansion of the gas in the cell that is traveling away from the optical sensor 200 during the pressure release (peak #1 with the amplitude of about +350 $\mu V$ above the mean at t=0.23 sec) and towards the optical sensor 200 (peak #2 with the amplitude of about −440 $\mu V$ below the mean at t=3.4 sec) due to reflections on the chamber components thereafter (viewing window and other hardware). This shows the increased sensitivity of the optical sensor 200 to the pressure gradient or the equivalent index of refraction gradient more than the sensitivity to the steady changes in pressure. Furthermore, the difference in shape in peak #1 and peak #2 indicates the optical sensor 200 has sufficient sensitivity to measure shock directionality (either moving towards or away from the optical sensor 200). In various embodiments, the system may measure the shock directionality for shocks moving parallel to the optical sensor 200 surface.

Figures 6A, 6B:
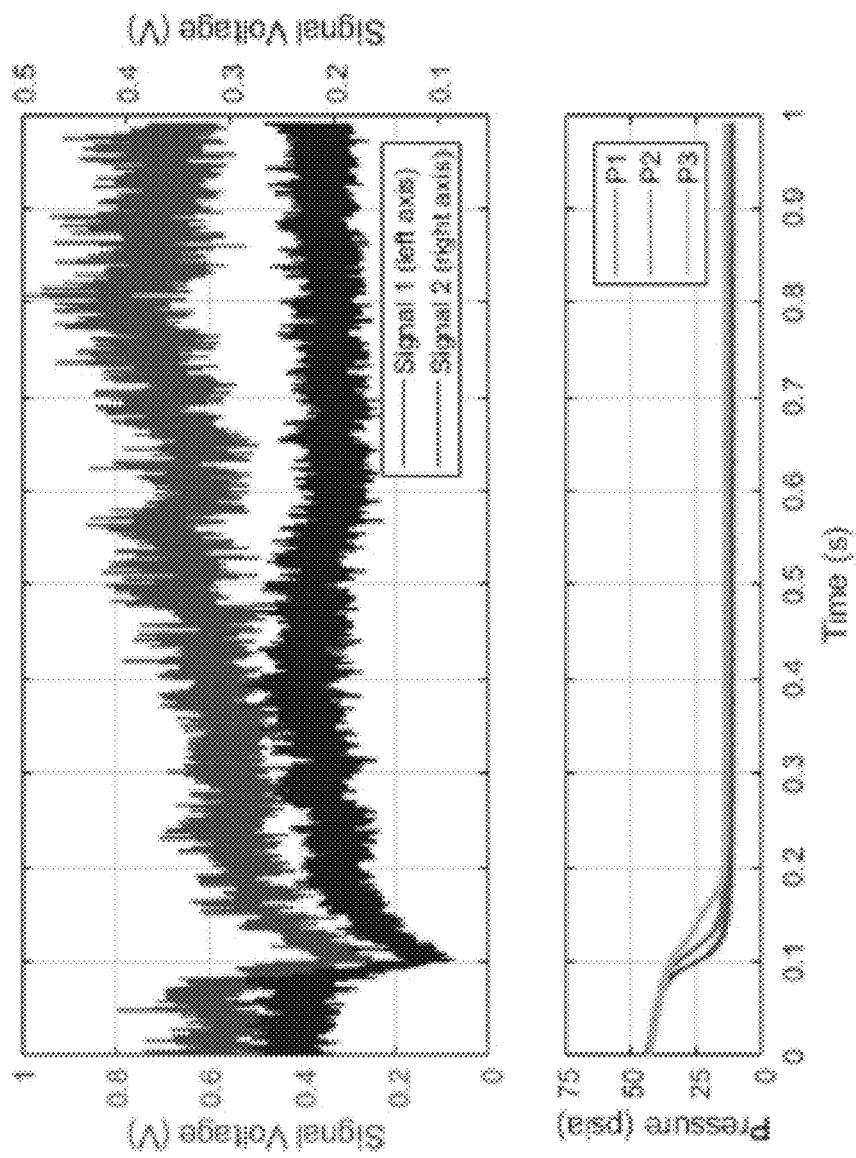
FIGS. 6A and 6B are illustrations of sensor signals from a typical test during a shock wave moving downstream towards a location of the optical sensor.
Figures 7A, 7B:
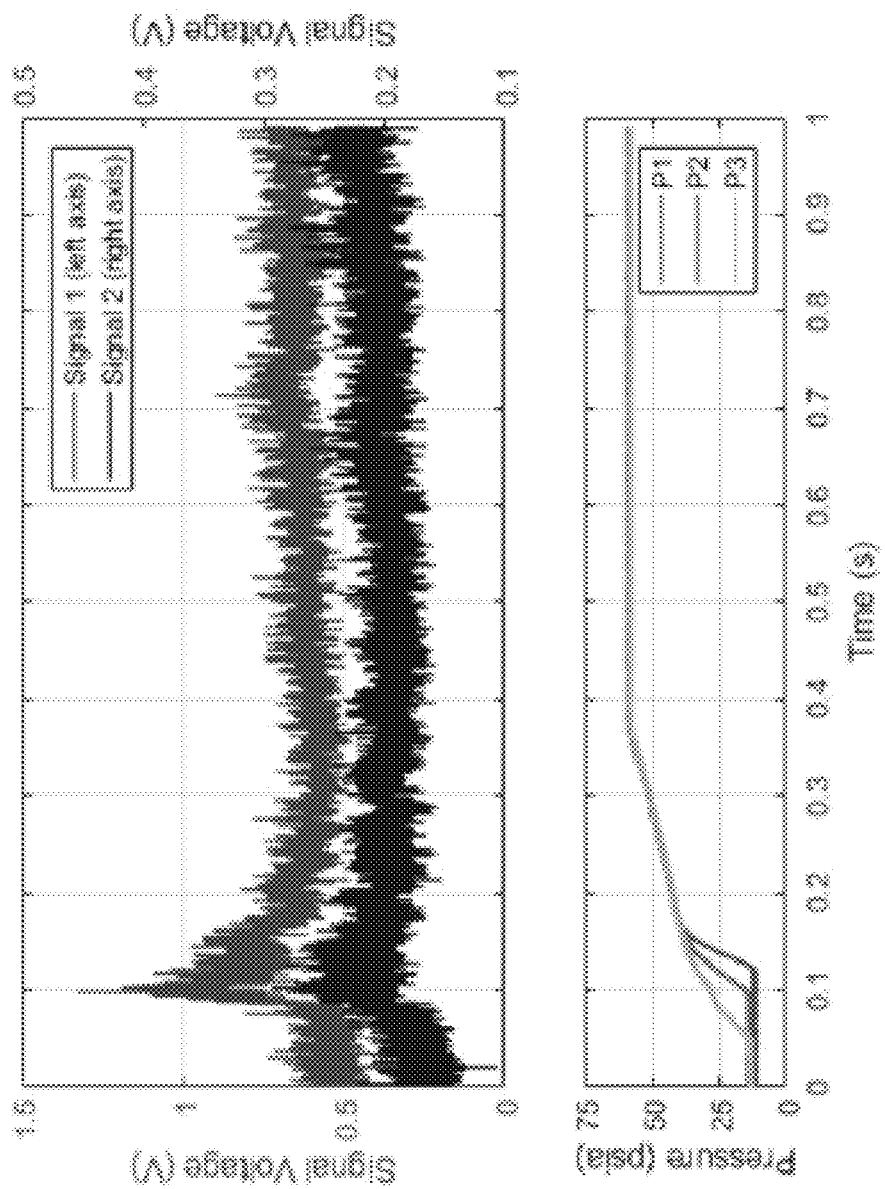
FIGS. 7A and 7B are illustrations of the shock wave moving upstream towards a stagnation chamber.

To further explore the optical sensor's 200 ability to measure the presence and movement of shock waves, a laboratory scramjet isolator test rig was used to control and move a generated shock-train across the optical sensor 200 in a well-studied isolator test rig. FIGS. 6A, 6B, 7A, and 7B show the measured sensor signals from two receiving fibers (6A and 7A, blue and red traces) and the corresponding temporal pressure traces (6B and 7B) from a typical dynamic test of the optical sensor 200 in which a shock-train is moved upstream and downstream across the optical sensor 200. In FIG. 6A, the shock wave traveling downstream towards the optical sensor 200 location, while in FIG. 7A, the shock wave travels upstream towards the stagnation chamber. Notice that in the separate measurement pressure plot shown in FIG. 6B, the temporal changes in the pressure are due to the traveling shock train is in the order first p1 (blue), second p2 (red) and third p3 (yellow) at approximately the optical sensor 200 location, which indicates the shock train is moving downstream (p1 will experience the pressure rise first, followed by p2, and lastly p3 as the leading edge of the shock train passes). Likewise, as shown in FIG. 7B the independently measured pressure traces increase in the reverse order (p3 will experience the pressure rise first, then p2 and lastly p1).

The pressure transducer response time on the order of one kHz is much less than the optical sensor 200 response time, which is on the order of MHz or higher. Therefore, the time scale shown by the pressure measurement is qualitative. Thus, the pressure data shows qualitatively when the flow in the test section is either subsonic or supersonic and when a shock train is passing across the transducer locations. The optical sensor 200 signal shows mainly the state of the boundary layer adjacent to the wall, and when the shock is over it, there is a sharp peak transition, whose concavity depends on whether the shock is moving downstream (concave down peak) or upstream (concave up peak). The spread in the sensor signal is the laser light noise superimposed with the vibration-induced variable coupling of the laser light source and receiver fiber(s).

Figures 8A, 8B, 8C:
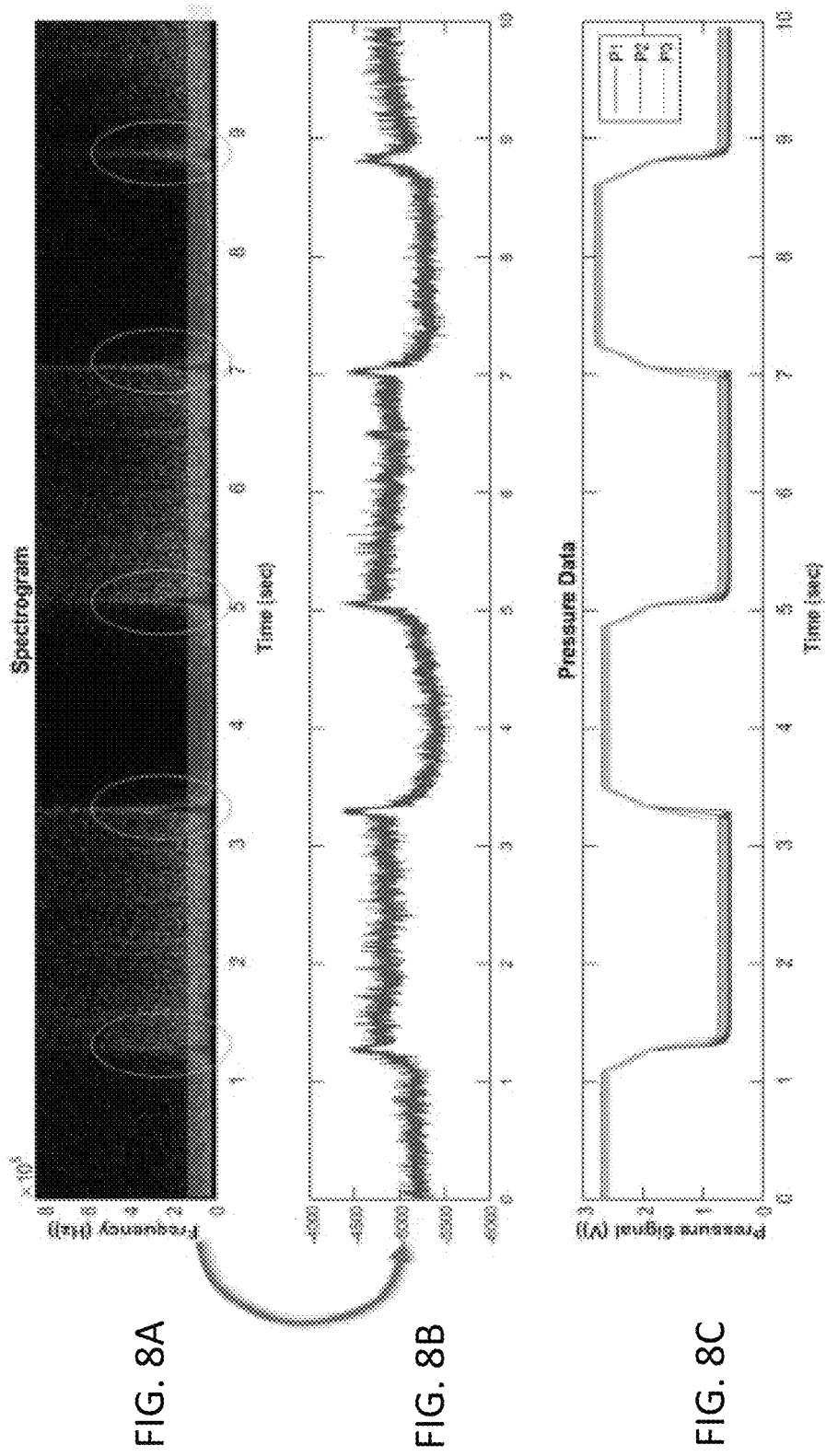
FIG. 8A is an illustration of a spectrogram of an optical signal.
FIG. 8B is an illustration of an average spectrum of the optical signal obtained from the spectrogram shown in FIG. 8A.
FIG. 8C is an illustration of pressure data obtained simultaneously with the optical sensor data.

In various embodiments, the optical sensor 200 signal(s) may be processed by applying a Digital Fast Fourier Transform (DFFT) to the signal to obtain the power spectral density (PSD) of the signal. This is shown in FIGS. 8A-8C for a 10-second duration test by controlling the shock train back and forth over the optical sensor 200. The difference in the frequency content (levels) before, during and aftershock wave transition event, as circled in the spectrogram plot in FIG. 8A can be easily discriminated in the processed sensor data. This emphasizes the ability of the optical sensor 200 to detect the passing of the shock wave, represented as a significant change in the frequency content, as shown in the FIG. 8B, and the direction in which the shock wave is passing over the optical sensor 200 represented as an increase in frequency content for downstream-moving shock waves or frequency content decrease for upstream-moving shock waves. The clear transition in the sensor signal indicates the optical sensor 200 has the potential to be utilized as part of a fast response shock detection system for implementation in control systems aimed at controlling shock trains location in scramjet isolators.

Figure 9:
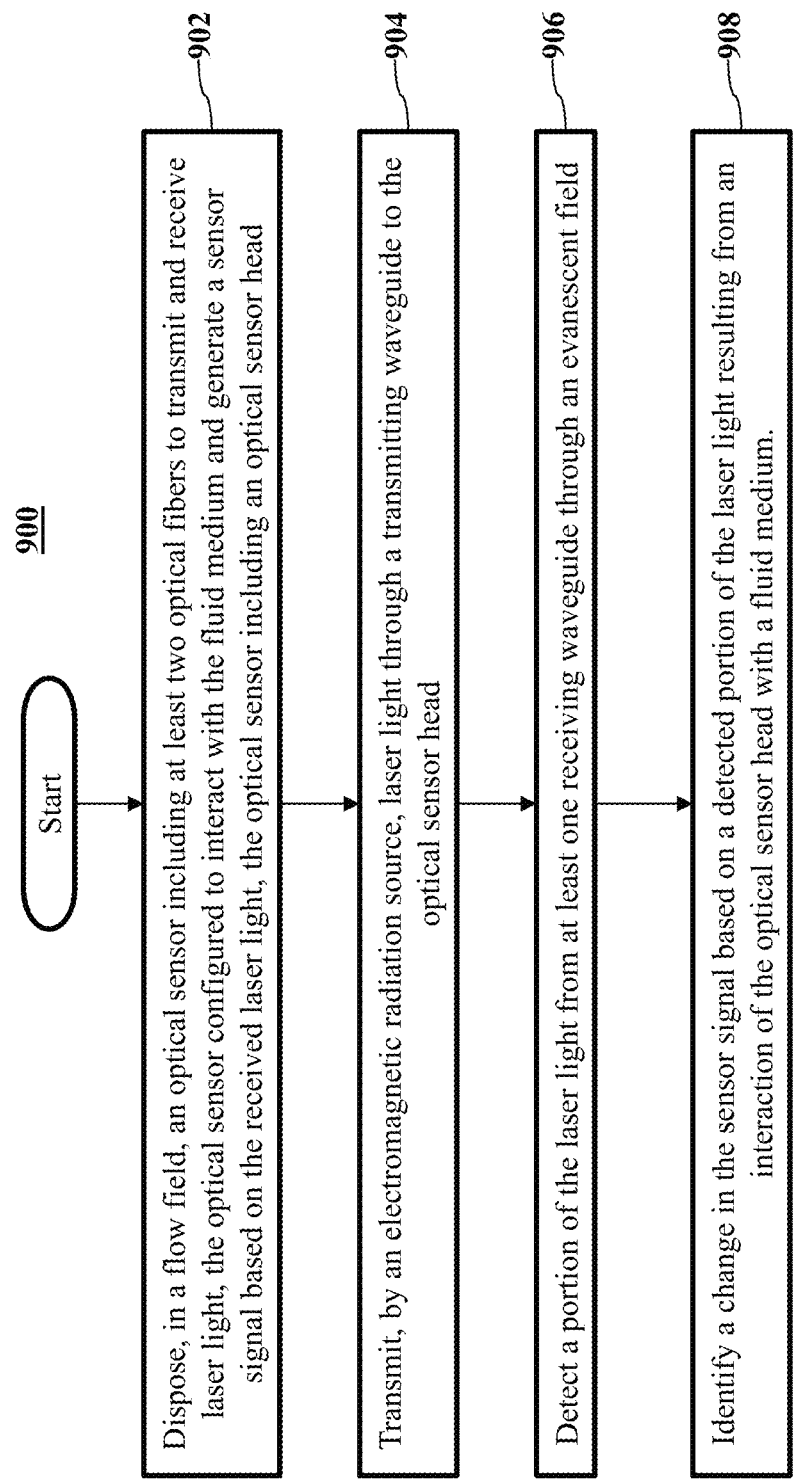
FIG. 9 is a block diagram of a method for detecting a shock wave in a fluid.

With reference to FIG. 9, an exemplary block diagram of a method 900 for detecting a shock wave in a fluid in accordance with aspects of this disclosure is shown. The following description will refer to the system 100, but it will be understood that such description is exemplary and does not limit the scope and applicability of this disclosure. The system 100 generally includes an optical sensor 200, a source 108, a receiver 110, a data control unit and analysis unit 106, and a user interface 122.

Initially, at step 902, an optical sensor 200 is disposed in a flow field. The optical sensor 200 includes at least two optical fibers 102A, 102B, to transmit and receive laser light. The laser light is positioned by the system in a flow field of a fluid via the optic fiber 102A. The laser light source includes an evanescent field coupling with the receiving fiber. In various embodiments, the fluid may include a high-speed fluid, a supersonic fluid or a hypersonic fluid, at cold or high temperatures. The fluid medium includes the boundary layer at the sensor-fluid interface.

Next, at step 904, the system 100 transmits monochromatic light through a transmitting waveguide towards the optical sensor head 103 from a laser source 108. In various embodiments, the light source may include a laser diode or a diode pumped solid-state laser (dpss laser). For example, compact 20-mW fiber-coupled laser diode at an exemplary wavelength of about 540 nm may be used as a light source 108. The light source 108 is optically coupled to the transmitting optic fiber 102A, which is configured to transmit the laser light. It is contemplated that there may be more than one transmitting fiber 102A and more than one wavelength. In one embodiment, the laser light is monochromatic. The optical sensor 200 interacts with the fluid medium and generates a sensor signal based on the received laser light, the optical sensor including an optical sensor head. In various embodiments, a microwave or RF energy source may be used instead of the light source.

Next, at step 906, the system 100 detects, by the receiver 110, a portion of the laser light that is received via a receiving waveguide. The laser light is communicated via the receiving fiber 102B to the receiver 110 photodetector. It is contemplated that there may be more than one receiving fiber 102B to monitor the sensor-fluid interface. At the sensor head, the receiving fiber 102B is parallel with the transmitting fiber 102A and is coupled together to facilitate directional coupling of the laser radiation from the laser source. The optical sensor 200 of the system 100 detects a portion of an evanescent field radiating through optical fiber walls of at least one optical fiber and the portion of the evanescent field interacting with the fluid. In various embodiments, a microwave or RF receiver may be used instead of the receiver 110.

Next, at step 908, the processor of the data control and acquisition unit 106 identifies a change in the sensor signal based on a detected portion of the laser light resulting from an interaction of the optical sensor head with a fluid medium and correlates the detected change with the fluid properties change.

In various embodiments, the processor of the data control and acquisition unit 106 identifies a magnitude of the evanescent field emanating from a light source configured to generate laser light. In various embodiments, the processor of the data control and acquisition unit 106 may be configured to identify an amount of radiation coupled to the receiver 110. In various embodiments, the processor of the data control and acquisition unit 106 may be configured to determine a direction of the moving shock wave relative to the optical sensor 200. In various embodiments, the processor of the data control and acquisition unit 106 may be configured to further detect a dynamic state of the boundary layer. In various embodiments, the system 100 may display on a display coupled to the processor, the identified magnitude of the evanescent field.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ this disclosure in virtually any appropriately detailed structure.

The phrases "in an embodiment," "in embodiments," "in various embodiments," "in some embodiments," or "in other embodiments" may each refer to one or more of the same or different embodiments in accordance with this disclosure.

It should be understood that the description herein is only illustrative of this disclosure. Various alternatives and modifications can be devised by those skilled in the art without departing from the disclosure. Accordingly, this disclosure is intended to embrace all such alternatives, modifications, and variances. The embodiments described are presented only to demonstrate certain examples of the disclosure. Other elements, steps, methods, and techniques that are insubstantially different from those described above and/or in the appended claims are also intended to be within the scope of the disclosure.

What is claimed is:

1. An optical sensor comprising:
at least two optical fibers to transmit and receive laser light, the at least two optical fibers including at least one transmitting optical fiber and at least one receiving optical fiber, the at least two optical fibers configured to be coupled at one end through an evanescent field of the at least one transmitting optical fiber to form an optical sensor head, wherein the at least two optical fibers are parallel and are directionally coupled together to facilitate a transfer of a portion of the transmitted laser light back to a receiver, the optical sensor head configured to be disposed in a flow field and configured to interact with a fluid medium, wherein the at least two optical fibers are configured to generate a sensor signal based on the received laser light.

2. The optical sensor of claim 1, wherein the optical sensor head is configured to interact with the fluid medium when the fluid medium is moving at supersonic or hypersonic speeds.

3. The optical sensor of claim 2, wherein the sensor signal is configured to indicate a detection of a moving shock wave in the fluid medium.

4. The optical sensor of claim 3, wherein the sensor signal is configured to further indicate a direction of the moving shock wave relative to the optical sensor.

5. The optical sensor of claim 2, wherein the optical sensor head is configured to interact with the fluid medium at a boundary layer of the fluid medium, the boundary layer disposed at an interface of the fluid medium and the optical sensor.

6. The optical sensor of claim 5, wherein the sensor signal is configured to further indicate a dynamic state of the boundary layer.

7. A non-transitory computer-readable medium that stores a program causing a computer to execute a computer-implemented method for measuring fluid medium properties in a fluid medium at an interface of the fluid medium and an optical sensor, the method comprising:
generating a sensor signal by the optical sensor, the optical sensor configured to be disposed, in a flow field, the optical sensor including an optical sensor head and at least two optical fibers to transmit and receive laser light, the optical sensor configured to interact with the fluid medium, wherein the at least two optical fibers are parallel and are directionally coupled together to facilitate a transfer of a portion of the transmitted laser light back to a receiver, wherein the generated sensor signal is based on the received laser light;
transmitting, by an electromagnetic radiation source, laser light through a transmitting waveguide to the optical sensor head;

detecting a portion of the laser light from at least one receiving waveguide through an evanescent field; and identifying a change in the sensor signal based on a detected portion of the laser light resulting from an interaction of the optical sensor head with the fluid medium.

8. The non-transitory computer-readable medium of claim 7, wherein the transmitting waveguide includes at least one transmitting optical fiber, and the at least one receiving waveguide includes at least one receiving optical fiber.

9. The non-transitory computer-readable medium of claim 8, wherein the method further includes coupling at least two optical fibers of the optical sensor head at one end through the evanescent field of the at least one transmitting optical fiber to form the optical sensor head, and wherein detecting the portion of the laser light from the at least one receiving waveguide through the evanescent field further includes detecting the portion of the laser light from the at least one receiving waveguide through the evanescent field when the laser light radiates through a transmitting optical fiber wall of the at least one transmitting optical fiber and interacts with the fluid medium at the interface.

10. The method of claim 9, further including directionally coupling the at least one transmitting optical fiber and the at least one receiving optical fiber through the evanescent field of the at least one transmitting optical fiber to generate a sensor signal by the optical sensor head when the at least one transmitting optical fiber and the at least one receiving optical fiber are partially immersed in the fluid medium.

11. The non-transitory computer-readable medium of claim 7, wherein the electromagnetic radiation source is a laser source.

12. The non-transitory computer-readable medium of claim 7, wherein the method further includes:

transmitting laser radiation from the optical sensor head by the at least one transmitting waveguide; and receiving laser radiation from the optical sensor head by the at least one receiving waveguide.

13. The non-transitory computer-readable medium of claim 7, wherein the optical sensor is configured to interact with the fluid medium when the fluid medium is moving at supersonic or hypersonic speeds.

14. The non-transitory computer-readable medium of claim 13, further including detecting a moving discontinuity in fluid medium properties of the fluid medium, the moving discontinuity including a moving shock wave, a moving shock train, or combinations thereof.

15. The non-transitory computer-readable medium of claim 14, wherein the method further includes detecting a direction of the moving discontinuity relative to the optical sensor head.

16. The non-transitory computer-readable medium of claim 13, wherein the fluid medium includes a boundary layer of the fluid medium at the interface, and wherein the method further includes detecting a dynamic state of the boundary layer.

17. The non-transitory computer-readable medium of claim 14, wherein the method further includes correlating the identified change in the sensor signal with the fluid medium properties change.

18. A non-transitory storage computer-readable medium that stores a program causing a computer to execute a computer-implemented method for measuring fluid medium properties in a fluid medium at an interface of the fluid medium and an optical sensor, the method comprising:

generating a sensor signal by the optical sensor, the optical sensor configured to be disposed, in a flow field, the optical sensor including an optical sensor head and at least two optical fibers to transmit and receive laser light, wherein the at least two optical fibers are parallel and are directionally coupled together to facilitate a transfer of a portion of the transmitted laser light back to a receiver, the optical sensor configured to interact with the fluid medium, wherein the generated sensor signal is based on the received laser light;

transmitting, by an electromagnetic radiation source, laser light through at least one transmitting waveguide to the optical sensor head;

detecting a portion of the laser light from at least one receiving waveguide through an evanescent field when the laser light radiates through a transmitting optical fiber wall of the at least one transmitting waveguide and interacts with the fluid medium at the interface; and identifying a change in the sensor signal based on a detected portion of the laser light resulting from an interaction of the optical sensor head with the fluid medium.

19. The non-transitory storage computer-readable medium of claim 18, wherein the electromagnetic radiation source includes a laser source.

20. The non-transitory storage computer-readable medium of claim 18, wherein the at least one transmitting waveguide includes at least one transmitting optical fiber, and the at least one receiving waveguide includes at least one receiving optical fiber.

\* \* \* \* \*